(12) United States Patent
Scebold et al.

(10) Patent No.: US 11,544,277 B2
(45) Date of Patent: Jan. 3, 2023

(54) QUERY TERM EXPANSION AND RESULT SELECTION

(71) Applicant: Raytheon Company, Waltham, MA (US)

(72) Inventors: John R. Scebold, Dallas, TX (US); Christine Nezda, Richardson, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/995,514

(22) Filed: Aug. 17, 2020

(65) Prior Publication Data
US 2022/0050847 A1   Feb. 17, 2022

(51) Int. Cl.
*G06F 16/9032* (2019.01)
*G06F 16/2457* (2019.01)

(52) U.S. Cl.
CPC .... *G06F 16/24578* (2019.01); *G06F 16/9032* (2019.01)

(58) Field of Classification Search
CPC ........... G06F 16/9032; G06F 16/24578; G06F 16/90335; G06F 16/90324
See application file for complete search history.

(56) References Cited

U.S. PATENT DOCUMENTS

| | | | | |
|---|---|---|---|---|
| 5,675,819 A | * | 10/1997 | Schuetze | G06F 40/253 704/10 |
| 2011/0040619 A1 | * | 2/2011 | Jebara | G06Q 30/08 705/14.46 |
| 2011/0213777 A1 | * | 9/2011 | Sun | G06F 16/353 707/E17.09 |

OTHER PUBLICATIONS

Max Welling, Belief Optimization for Binary Networks: a stable Alternative to Loopy Belief Propagation, Jan. 10, 2013, v1, pp. 554-561 (Year: 2013).*
Agnihotri, Deepak, et al., "Computing symmetrical strength of N-grams: a two pass filtering approach in automatic classification of text documents", SpringerPlus 5:942, (2016), 29 pgs.
Elkherj, Matthew, "A Practitioner's Guide to Similarity Scoring, Part 1", Towards Data Science, [Online]. Retrieved from the Internet: <URL: https://towardsdatascience.com/a-practitioners-guide-to-similarity-scoring-part-1-29625b9ac481>, (Sep. 9, 2019), 9 pgs.
Hu, Zhen, et al., "Clustering Algorithm Based on Mutual K-Nearest Neighbor Relationships", Statistical Analysis and Data Mining, vol. 5, (2012), 100-113.

(Continued)

*Primary Examiner* — Taelor Kim
(74) *Attorney, Agent, or Firm* — Schwegman Lundberg & Woessner, P.A.

(57) ABSTRACT

Devices, systems, and methods for improving results returned from a query. A method can include identify, based on a term embedding of a corpus of terms, expansion terms of a raw query term that are nearest the raw query term, normalize distances between the raw query term and the identified expansion terms, identify, based on the term embedding, expansion term neighbors of an expansion term that are nearest the expansion term; normalize distances between the expansion term and the identified expansion term neighbors, determine a WMA weight between the raw query term and the expansion term, and execute the query with the raw query terms and the expansion terms (determined based on the WMA weight) to generate query results.

18 Claims, 7 Drawing Sheets

(56) References Cited

OTHER PUBLICATIONS

Miinker, Jack, et al., "An Evaluation of Query Expansion by the Addition of Clustered Terms for a Document Retrieval System", Inform. Stor. Retr. vol. 8, (1972), 329-348.

Mitra, Bhaskar, et al., "Dual Embedding Space Model for Document Ranking", arXiv:1602.01137v1 [cs.IR], [Online]. Retrieved from the Internet: <URL: https://arxiv.org/pdf/1602.01137.pdf>, (Feb. 2, 2016), 10 pgs.

Peat, Helen, et al., "The Limitations of Term Co-Occurrence Data for Query Expansion in Document Retrieval Systems", Journal of the American Society for Information Science 42(5), (1991), 378-383.

Pennington, Jeffrey, et al., "GloVe: Global Vectors for Word Representation", [Online]. Retrieved from the Internet: <URL: https://nlp.stanford.edu/projects/glove/>, (2014), 4 pgs.

Qiu, Yonggang, et al., "Concept based query expansion", SIGIR, (1993), 160-169.

Smeaton, A F, et al., "The Retrieval Effects of Query Expansion on a Feedback Document Retrieval System", Computer Journal vol. 26, No. 3, (1983), 239-246.

Vaswani, Ashish, et al., "Attention is All You Need", 31st Conference on Neural Information Processing Systems. arXiv:1706.03762v5 [cs.CL], (Dec. 6, 2017), 15 pgs.

Wang, Daisy, et al., "Selectivity Estimation for Extraction Operators over Text Data", IEEE 27th International Conference on Data Engineering, [Online]. Retrieved from the Internet: <URL: https://ieeexplore.ieee.org/document/5767931>, (2011), 12 pgs.

Zhu, Huaiyu, et al., "Topic Learning from Few Examples", Knowledge Discovery in Databases: PKDD Lecture Notes in Computer Science. vol. 2836, [Online]. Retrieved from the Internet: <URL: https://link.sprlnger.com/chapter/10.1007/978-3-540-39804-2_43>, (2003), 483-494.

\* cited by examiner

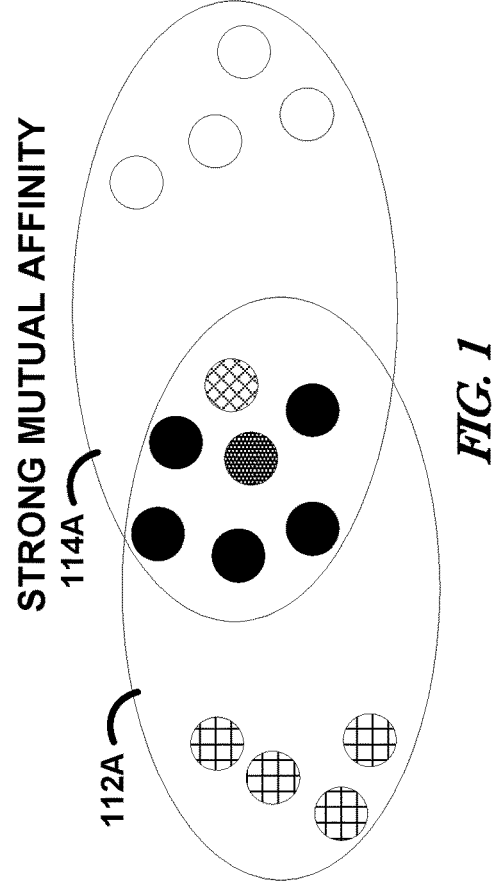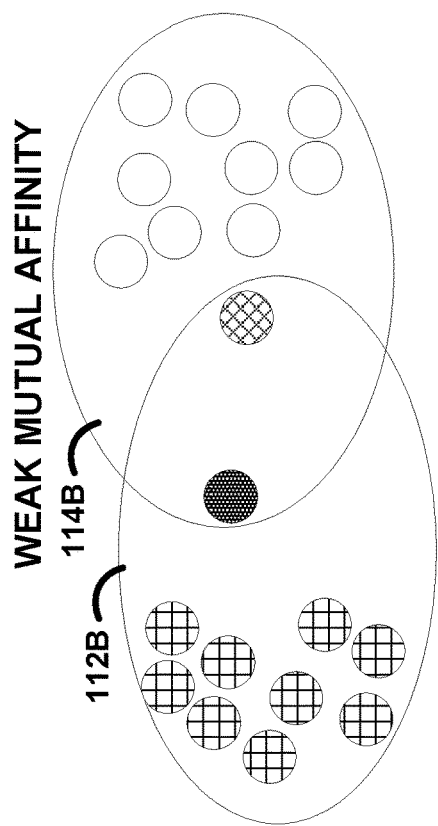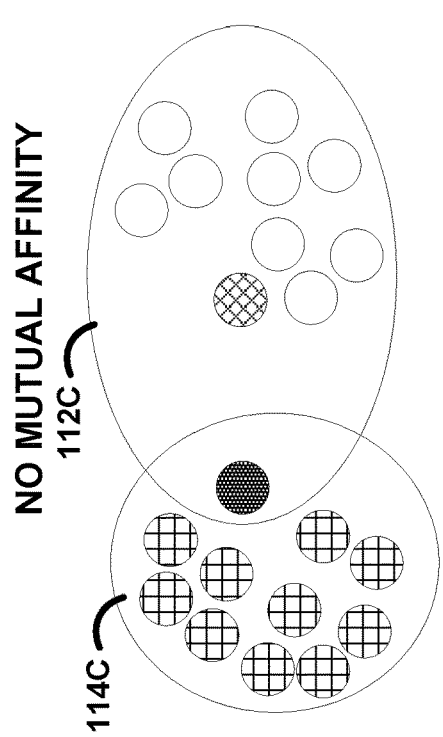
FIG. 1
FIG. 2
FIG. 3

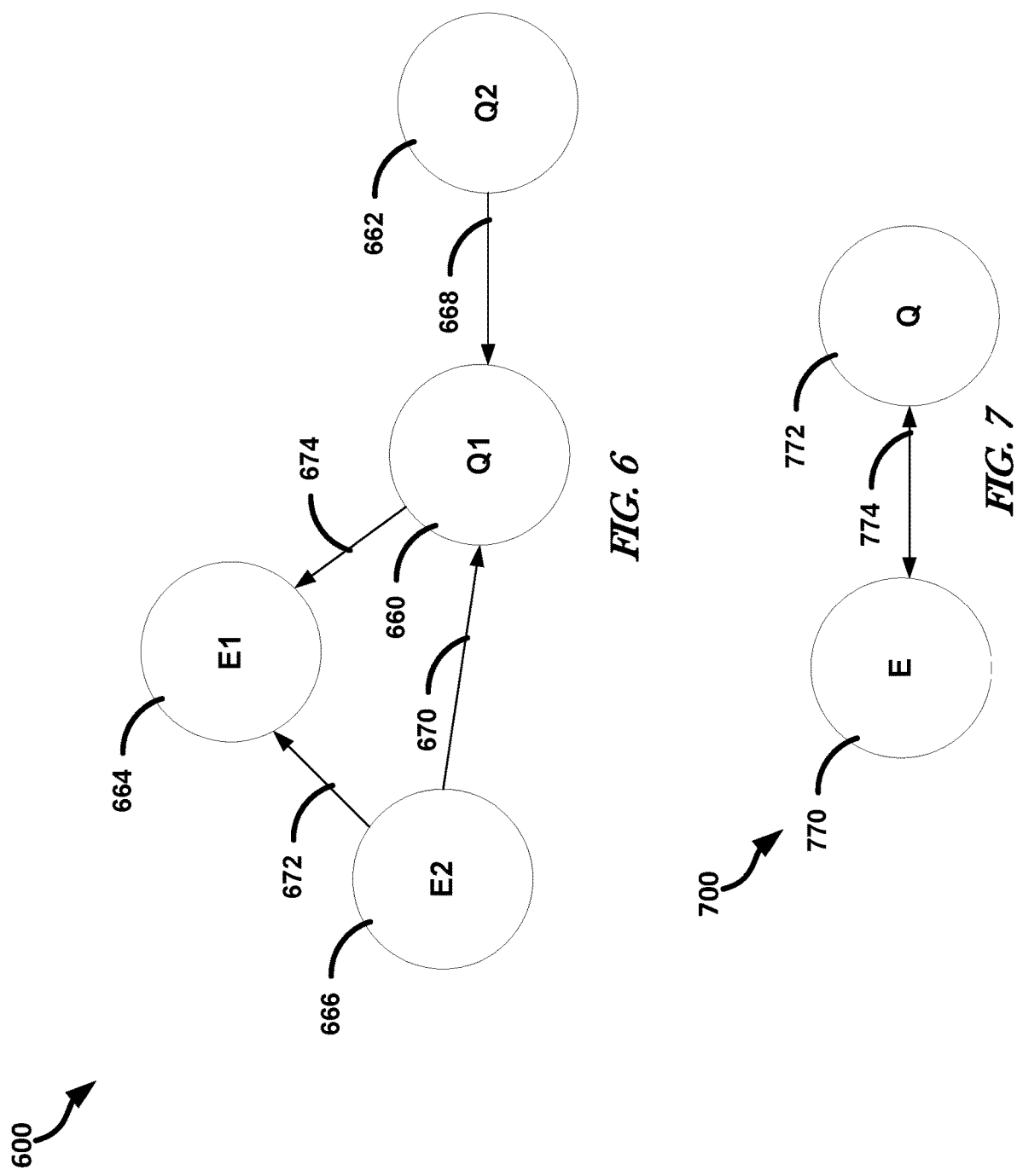

QUERY TERM EXPANSION AND RESULT SELECTION

TECHNICAL FIELD

Embodiments discussed herein regard devices, systems, and methods for retrieving results for a query. Some embodiments regard expanding and culling expanded query terms. Some embodiments regard culling retrieved documents.

BACKGROUND

Some prior query result retrieval techniques include using a thesaurus to expand query terms. These techniques require a significant amount of data in storing the thesaurus. Some prior query result retrieval techniques include using graph clustering to expand query terms. These techniques require more compute bandwidth than may be available. Some prior query result retrieval techniques include augmented word embedding model to compute a result relevance and provide results based on the result relevance. Some prior query result retrieval techniques include deep learning with attention.

BRIEF DESCRIPTION OF THE DRAWINGS

FIG. 1 illustrates, by way of example, a diagram of an embodiment of terms with a strong mutual affinity.

FIG. 2 illustrates, by way of example, a diagram of an embodiment of terms with a weak mutual affinity.

FIG. 3 illustrates, by way of example, a diagram of an embodiment of terms with no mutual affinity.

FIG. 6 illustrates, by way of example, a diagram of an embodiment of a belief network to perform operation.

FIG. 7 illustrates, by way of example, a diagram of an embodiment of a belief network for performing the operation.

DETAILED DESCRIPTION

Figure 4:
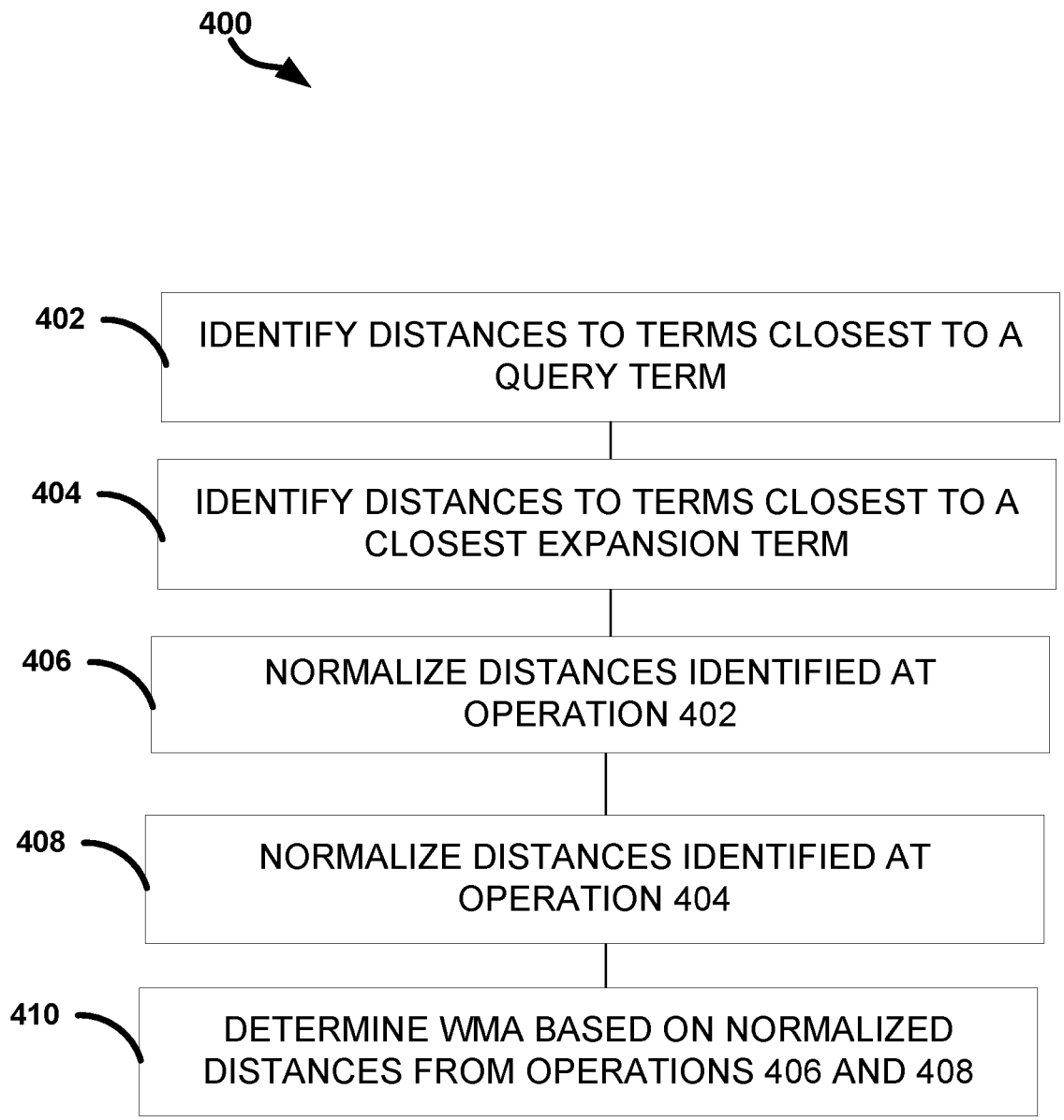
FIG. 4 illustrates, by way of example, a diagram of an embodiment of a method for determining WMA.

Embodiments provide methods, systems, devices, and computer-readable media for query result retrieval. Embodiments can provide for culling of expansion terms $e_j \in \{E\}$. Culling of the expansion terms can help reduce instances of providing irrelevant results. The culling can reduce irrelevant expansion terms that were generated for homonyms (words with multiple different meanings). Example homonyms are "bark", "organ", "flag", "swing", "bow", among many others. The culling can reduce expansion terms that are related to a query term but not the query subject. For example, a query for "aerospace aluminum" can produce an expansion term of "hydroxide". "Hydroxide" is related to aluminum but may not be relevant to aluminum in the subject defined by "aerospace aluminum".

Embodiments can provide for culling of retrieved documents to generate a culled document set. The culling can upgrade or downgrade (increase or decrease an associated score) respective documents returned based on the expansion and query terms in the documents. Embodiments can further provide for ranking and further culling of the culled document set. Similar to reducing the expansion set, reducing the retrieved documents, further culling and ranking can help reduce or eliminate any documents that may regard a homonym or an irrelevant subject.

Some embodiments can include determining a weighted mutual affinity (WMA) between a query word and a closest expansion word. WMA is described regarding FIGS. 1-4.

A word embedding is a numerical vector representing a lexical term, trained by a neural network (NN) on a corpus of text. The numerical values in the vector capture something of the semantics of the word as it is used in the corpus. A cosine distance (sometimes called a cosine similarity) between two term vectors gives a notion of how those terms were used in similar contexts throughout the corpus. The cosine similarity gives a measure of how semantically similar terms are. Another way to think of it, is that the cosine distance shows how likely one term could be replaced by another and the sentence still make sense. "Water" and "liquid" may be close (cosine distance close to 1) while "ice" and "telephone" may be far (cosine distance close to 0).

A word embedding model encodes a vector for every unique word found in the training corpus. One can define a number, r, (we use ten or greater) and then ask the model for the r words closest to a target word t as measured by cosine distance. Cosine is symmetric, but not sufficient to capture the mutual or bidirectional affinity between word pairs. This is explained in more detail regarding FIGS. 1-3.

FIG. 1 illustrates, by way of example, a diagram of an embodiment of terms with a strong mutual affinity. FIG. 2 illustrates, by way of example, a diagram of an embodiment of terms with a weak mutual affinity. FIG. 3 illustrates, by way of example, a diagram of an embodiment of terms with no mutual affinity.

In FIGS. 1-3, a query term 102 of a possible multiple query terms is selected. The word embedding vector (WEV) of the query term 102 is compared to respective WEVs of other terms in a corpus of terms (e.g., via cosine similarity). The terms of the corpus with WEVs closest to the WEV of the query term 102 are identified (represented by ellipse 112A, 112B, 112C). Terms in the ellipse 112A, 112B, 112C that are not the query term 102 are called query term neighbors 106.

A similar process is performed for each of the query term neighbors 106, 110. These terms are called the expansion terms including an expansion term of interest 104. The remaining process is described with respect to the expansion term of interest 104 but can be performed for each of the expansion terms 106.

The WEV of the expansion term of interest 104 is compared to respective WEVs of other terms in the corpus of terms (e.g., via cosine similarity). The terms of the corpus with WEVs closest to the WEV of the expansion term of interest 104 are identified (represented by ellipse 114A, 114B, 114C). In the example of FIGS. 1-3, the nine terms with WEVs closest to the query term 102 and the nine terms with WEVs closest to the expansion term of interest 104 are identified. Terms in the ellipse 114A, 114B, 114C that are not the expansion term of interest 104 are called expansion term neighbors 108. A term in both of the ellipses 112A and 114A, 112B and 114B, 112C and 114C are called query and expansion term neighbors 110.

In FIG. 1, the sets defined by the ellipses 112A, 114A include the query term 102, the expansion term of interest 104, and some query and expansion term neighbors 110. As the query term 102 and the expansion term of interest 104 are most semantically similar (according to the cosine similarity) to themselves and other terms in the corpus, they have a strong mutual affinity for each other. That is, they are more likely to be semantic replacements for each other than the query terms and expansion terms of FIGS. 2 and 3.

In FIG. 2, the sets defined by the ellipses 112B, 114B include the query term 102 and the closest expansion term 104 therein, but no other overlap between the sets. Also, the query term 102 and the expansion term of interest 104 are not each other's closest neighbor in the word embedding space. As the query term 102 and the expansion term of interest 104 have no neighbors in common, they are less likely to be semantic replacements for each other than those terms of FIG. 1.

In FIG. 3, the sets defined by the ellipse 112C includes the query term 102 and the expansion term of interest 104 therein, but the ellipse 114C does not contain the query term 102 therein. That is, the expansion term of interest 104 is more semantically similar to at least nine other terms in the corpus than it is to the query term 102. In this situation, there is said to be no mutual affinity between the query term 102 and the closest expansion term 104. Said another way, the query term 102 does not appear within the top n neighbors to the expansion term of interest 104, thus there is no mutual affinity between the query term 102 and the expansion term of interest 104.

These FIGS. highlight a problem with cosine similarity as a measure of semantic similarity. In each of the cases of FIGS. 1-3, the expansion term of interest 104 is the term being considered in the word embedding. However, the cosine similarity provides no measure of how many other terms in the corpus are more semantically similar to the expansion term of interest 104. Another problem with cosine similarity is that it is symmetric. That is cos_similarity (a, b)=cos_similarity (b, a). This symmetry provides no knowledge of how much closer the expansion term of interest 104 is to the query term 102 versus how close the expansion term of interest 104 is to other expansion term neighbors 108, 110 terms and vice versa; how much closer the query term 102 is to the expansion term of interest 104 versus how close the query term 102 is to other query term neighbors 106, 110 terms. WMA overcomes these shortcomings of cosine similarity to provide a more accurate measure and ranking of semantic similarity between terms of a corpus. The WMA thus more accurately predicts whether one term of the corpus can be substituted with another term of the corpus.

FIG. 4 illustrates, by way of example, a diagram of an embodiment of a method 400 for determining WMA. The method 400 as illustrated includes identifying distances (e.g., cosine similarity, Euclidean, Manhattan, or the like) to terms closest to a query term 102 in a word embedding, at operation 402; identifying distances to terms closest to the closest expansion term 104, at operation 404; normalizing the distances identified at operation 402, at operation 406; normalizing the distances identified at operation 404, at operation 408; and determining a WMA value (sometimes called a WMA weight) based on the normalized distances determined at operations 406 and 408, at operation 410.

In mathematical terms, let q be a word embedding of the query term 102, let e be a word embedding of the closest expansion term 104, let r be the number of closest terms to identify at operations 402 and 404. Let nearest $(q, r) = (qn_1, qn_2, \ldots qn_r)$, where $(qn_1, qn_2, \ldots qn_r)$ are the respective distances between q and the nearest r terms to q in the embedding and $qn_1$ is the distance to e. Let nearest $(e, r) = (en_1, en_2, \ldots en_r)$, where $(en_1, en_2, \ldots en_r)$ are the respective distances between e and the nearest r terms to e in the embedding. Note that the distance from e to q may or may not be in $(en_1, en_2, \ldots en_r)$ as q may or may not be one of the nearest r terms to e in the embedding. For a graphical explanation of this please refer to FIGS. 1-3. Let eq represent the distance between e and q in $(en_1, en_2, \ldots en_r)$ in instances in which q is one of the r terms closest to e in the embedding. Let $\mathrm{norm}(qn_1, qn_2, \ldots qn_r) = (\overline{qn_1}, \overline{qn_2} \ldots \overline{qn_r})$ be the distances between q and the nearest r terms to q normalized to sum to some constant, c (usually one (1), but others constants are possible). Let $\mathrm{norm}(en_1, en_2, \ldots eqn_r) = (\overline{en_1}, \overline{en_2} \ldots \overline{en_r})$ be the distances between e and the nearest r terms to e normalized to sum to the constant, c.

Then $\mathrm{WMA}(q, e) = f(\overline{qn_1}, \overline{eq})$. If q is not among the nearest r terms to e then $\mathrm{WMA}(q, e) = 0$. This is similar to cosine similarity in that the higher the value produced, the better chance there is that the two terms q and e can be substituted for one another. However, this is different from cosine similarity in that it is not symmetric. This is because of the normalizing operations 406 and 408.

The operations 406, 408 serve to rank neighbors of a term by distance; but not only rank, they show by what margin one neighbor is closer than another. So even if $\overline{eq} = \overline{en_1}$ (e and q are each other's nearest neighbors: rank=1) $\overline{eq}$ and $\overline{qn_1}$ will have different values. $\overline{qn_1}$ could indicate that e is q's closest neighbor by a large margin. $\overline{eq}$ can indicate that q is the closest neighbor to e but by a small margin; e has a very close $2^{nd}$ closest neighbor.

Since q and e do not necessarily have the same r closest neighbors, and the distances between (i) q and an arbitrary nearest neighbor $qn_2$ and (2) e and $qn_2$ are very likely different as q and e are represented by different word embeddings. Further, normalized distances $\overline{qn_1}$ and $\overline{eq}$ are not necessarily the same because of the differences in distances to the nearest r terms.

In some embodiments, $f(\overline{qn_1}, \overline{eq}) = \overline{eq}/\overline{qn_1}$. In some embodiments, $f(\overline{qn_1}, \overline{eq}) = \log(\overline{eq}/\overline{qn_1})$. In some embodiments, $f(\overline{qn_1}, \overline{eq}) = \log_2(\overline{eq}/\overline{qn_1} + 1)$. In some embodiments, $f(\overline{qn_1}, \overline{eq}) = \overline{qn_1} * \log_2(\overline{eq}/\overline{qn_1} + 1)$.

The following Tables 1-3 describe calculating the WMA weight for the words "scatterable" and "ieds" using a cosine similarity distance, r of ten (10), normalizing the distances to sum to one (1), and $f(\overline{qn_1}, \overline{eq}) = \overline{qn_1} * \log_2(\overline{eq}/\overline{qn_1} + 1)$.

TABLE 1

Normalized Distances between query term and r nearest neighbors.

| NEIGHBOR TERM | NORMALIZED DISTANCE TO "SCATTERABLE" |
|---|---|
| IEDS | 0.10899 |
| ANTIPERSONNEL | 0.10631 |
| EMPLACED | 0.10539 |
| MAGNETIC | 0.10391 |
| DIRECTIONAL | 0.10371 |
| EASIER | 0.09667 |
| PROSECUTION | 0.09523 |
| BURIED | 0.09401 |
| PUBLISHING | 0.09382 |
| MINES | 0.09195 |

Note
"ieds" is the closest neighbor to "scatterable"

TABLE 2

Normalized Distances between closest
neighbor term and r nearest neighbors.

| TERM | NORMALIZED DISTANCE TO "IED S" |
|---|---|
| SCATTERABLE | 0.12368 |
| MINES | 0.11384 |
| MAGNETIC | 0.10040 |
| ANTIPERSONNEL | 0.09768 |
| PHOTOGRAPHIC | 0.09760 |
| MINI | 0.09453 |
| LANDMINES | 0.09407 |
| ARREST | 0.09372 |
| COMPETENT | 0.09247 |
| EMPLACED | 0.09202 |

Note
"scatterable" is the closest neighbor to "ieds", but this symmetry between q and e is not always present.

TABLE 3

WMA weights for terms "scatterable" and "ieds".

| WMA ("scatterable", "ieds") | $0.10899*\log_2(0.12368/0.10899 + 1) = 0.11924$ |
|---|---|
| WMA ("ieds", "scatterable") | $0.12368*\log_2(0.10899/0.12368 + 1) = 0.11276$ |

Note
that the WMA values are not symmetric.

The WMA weights for query terms can, for example, be used to determine expansion terms for a query. If the WMA weight for the closest query term is non-zero, the neighbors that appear in both the sets defined by ellipses 112A and 114A, for example, can be identified. In the Example of TABLES 1 and 2, TABLE 1 can be represented by the ellipse 112A, and TABLE 2 can be represented by the ellipse 114A. The terms that fall within the intersection of both ellipses 112A, 114A can be used as expansion terms for the query term. In the example of TABLES 1 and 2, the terms nearest "scatterable" that include "scatterable" within their nearest neighbors include {"ieds", "antipersonnel", "directional", and "mines"}. In the context of generating a query, these terms can be added to a query before the query is sent to be executed.

In some embodiments, a normalized WMA value can be determined for each of the terms that are (a) in the closest neighbors to the query term and (b) include the term query term among their closest neighbors. The normalized (or unnormalized) WMA value can be compared to a threshold value (user-configurable). Each term with a normalized (or unnormalized) WMA value greater than the threshold can be added to the query as an expansion term. TABLE 4 shows the normalized WMA values for the terms in TABLES 1 and 2.

TABLE 4

Normalized WMA values for terms that are
within the r closest neighbors to q and e.

| NEIGHBOR TERM | NORMALIZED WMA VALUE |
|---|---|
| IEDS | 0.27343 |
| ANTIPERSONNEL | 0.25200 |
| EMPLACED | 0.0 |
| MAGNETIC | 0.0 |

TABLE 4-continued

Normalized WMA values for terms that are
within the r closest neighbors to q and e.

| NEIGHBOR TERM | NORMALIZED WMA VALUE |
|---|---|
| DIRECTIONAL | 0.23107 |
| EASIER | 0.0 |
| PROSECUTION | 0.0 |
| BURIED | 0.0 |
| PUBLISHING | 0.0 |
| MINES | 0.24350 |

In some embodiments, the numbers in TABLE 4 can be greater than zero and include e, only if q is in the r nearest neighbors to e. Note e is guaranteed to be in q by definition of being the closest neighbor to q. In some embodiments, if q is not in the r nearest neighbors to e, then the WMA is zero. In such circumstances, no expansion terms will be included in the query.

Not all terms in the expansion can be valid for a query. Not all documents returned for an executed query can be relevant to the query. Techniques for culling the expansion terms before execution of the query and techniques for reducing and ranking the results before returning the results are desired.

A basic document retrieval strategy can include: the user entering a database query for documents in a corpus. The user may or may not have knowledge of the documents in the corpus. Documents determined to best match the query are returned and ranked using term frequency-inverse document frequency (tf-idf). This strategy has drawbacks including that relevant documents may be missed because the user did not include synonyms for query terms in the query; and tf-idf can spuriously up-rank documents which are not really relevant to the query.

A corpus is a set of documents. A word embedding, as previously discussed, represents a lexical word. The word embedding is typically determined using an NN, such as GloVe or another. The numerical values in the word embedding (a vector) capture the semantics of the word as it is used in the corpus. Query terms have word embeddings and are provided in a query issued by the user. The embeddings of the query terms can be represented as random variables, Q. Expansion terms have word embeddings and are determined using the method 400, for example, to determine WMA weights and then retaining the expansion words with WMA weights (or normalized WMA weights) greater than a threshold value. The embeddings of the expansion terms can be represented as random variables E. The set of all query terms is denoted as {Q} and the set of all retained expansion terms is denoted as {E}.

Figure 5:
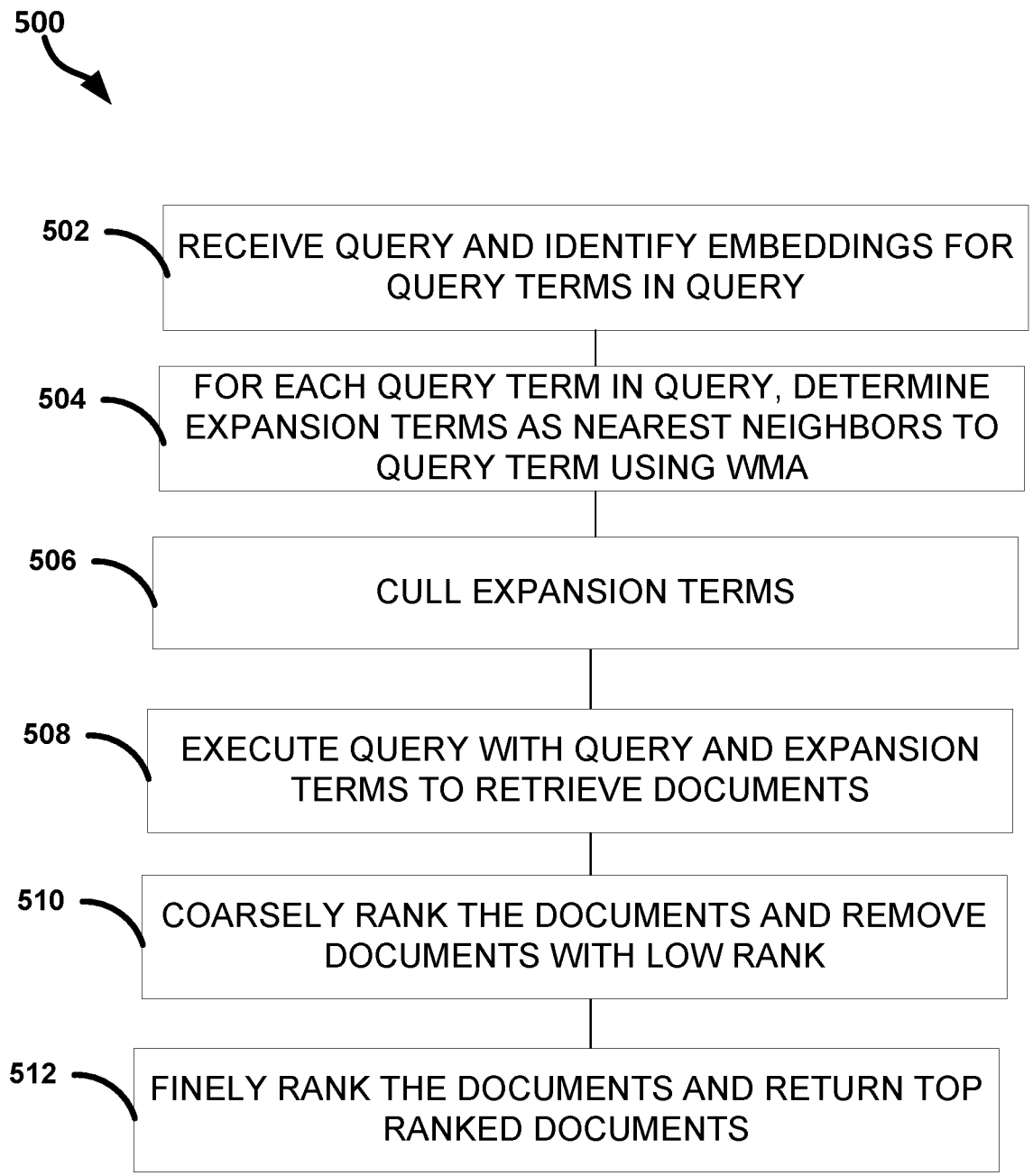
FIG. 5 illustrates, by way of example, a diagram of an embodiment of a method for relevant document retrieval.

FIG. 5 illustrates, by way of example, a diagram of an embodiment of a method 500 for relevant document retrieval. The method 500 as illustrated includes receiving a query and forming {Q} by fetching the corresponding embedding vectors, at operation 502; for each query term with an embedding in {Q}, finding the top r nearest neighbor words measured by WMA, the embeddings of these words forms {E}, at operation 504; applying a pre-weight and cull technique (see FIG. 6) to remove one or more of the expansion terms, at operation 506; retrieving documents based on the words represented by embeddings in {Q} ∪ {E}, at operation 508; applying a post-weight technique (see FIG. 7) to coarsely rank the documents and removing one or more of the documents based on the ranking, at operation 510; and applying an attention-focus technique to the retained documents to finely rank the retained documents and returning the top ranked retained documents, at operation 512. Using WMA as opposed to other distance measures helps ensure a tighter semantic coupling between {Q} and {E}.

The query, received at operation 502, is typically issued through a user interface (UI). The user enters a query into a text box and the contents of the text box are submitted to a database manager. The database manager then determines which documents to retrieve based on the query.

The database manager or a device coupled to the database manager can determine possible synonyms for the query term, such as by using WMA at operation 504. The WMA technique described regarding FIG. 4 can be used to determine the synonyms.

The operation 506 can be used to eliminate the worst of expansion terms in {E} which are the least cohesive to the whole set of {Q, E}. This is sometimes called a pre-weight because it is performed before submitting the query to the database manager. The operation 506 is discussed in more detail regarding FIG. 6.

After the user has entered a set of one or more query terms {Q}, the query terms are used to determine corresponding word embeddings for a set of expansion terms {E}, such as by using WMA. Some of the expansion terms may not have much to do with the intent of the query, and thus not be very semantically cohesive with the entire {Q, E} set. For example, consider a user searching for "aluminum, aerospace". Aluminum has expansion terms like "titanium" and "hydroxide". Intuitively, titanium is relevant to "aerospace" (the other query term), but hydroxide is not. The operation 506 can discover and quantify the association or dissociation between the expansion term and the entire {Q, E} set and remove "hydroxide" from {E}. Formally, the operation 506 discovers how cohesive {Q, E} is as a cluster. It takes as input a radius r for how many terms should be expanded from each q in {Q} and a cutoff percentile or number p. After expansion it culls the bottom p words from {E} thus reducing the size of {Q, E} and the cluster radius. All of {Q} is retained. r and p should be kept proportional.

The operations 506, 510, and 512 can use respective belief networks. Belief networks are used in belief propagation to determine probabilities across belief networks. A belief network is a graph of multiple random variables, represented by nodes, with arrows on edges between one or more of the nodes representing data flow between the random variables.

Belief propagation is sometimes called sum-product message passing. Belief propagation performs an inference on a network. The belief propagation network determines a marginal distribution for each unobserved node conditional on any observed nodes.

FIG. 6 illustrates, by way of example, a diagram of an embodiment of a belief network 600 to perform operation 506. The belief network 600 as illustrated includes a first query node 660, a second query node 662, a first expansion word 664, and a second expansion node 666. The second query node 662 issues messages to the first query node 660 (indicated by arrow 668). The first query node 660 issues messages to the first expansion node 664 (indicated by arrow 674). The first query node 660 receives messages from the second expansion node 666 (indicated by arrow 670). The second expansion node 666 issues messages to the first expansion node 664 (indicated by arrow 672).

The following equations define the operations of the belief network 600:

Potential Functions $Q$ node potential=$1/\text{len}(\{Q\})$  Equation 1

$E$ node potential($e_i$)=WMA($e_i$)  Equation 2

Edge potential($x_i, x_j$)=$\cos(x_i, x_j)$  Equation 3

Messages $$M_{Q2 \to Q1}(q_i) = \sum_{q_j \in Q2} \frac{1}{\text{len}(\{Q\})} * \cos(q_i, q_j)$$  Equation 4

$$M_{E2 \to Q1}(q_j) = \sum_{e_i \in E2} \text{WMA}(e_i) * \cos(e_i, q_j)$$  Equation 5

$$M_{E2 \to E1}(e_j) = \sum_{e_i \in E2} \text{WMA}(e_i) * \cos(e_i, e_j)$$  Equation 6

$$M_{Q1 \to E1}(e_j) = \sum_{q_i \in Q1} \frac{1}{\text{len}(\{Q\})} * \cos(q_i, e_j) * M_{E2 \to Q1}(q_j) * M_{Q2 \to Q1}(q_j)$$  Equation 7

Belief at E1

$B_{E1}(e_i)$=WMA($e_i$)*$M_{E2 \to E1}(e_i)$*$M_{Q1 \to E1}(e_i)$  Equation 8

Where len{Q} is the number of original user query terms in the query that are expanded to determine expansion terms. Note that, WMA takes two arguments when calculated. Equation 2 shows only one expansion term, which indicates that the WMA can be looked up by the expansion term. Note that some terms in a query may be removed from the query, such as any word that is not in the corpus of documents or for which no word embedding has been provided.

Each node of the belief network 600 can include an associated potential score as a function of the value the node has taken. The potential at the first query node 660 and the second query node 662 is uniform over all values of {Q} and can be defined as Equation 1. The potential at the first expansion node 664 and second expansion node 666 can be the WMA score associated with the expansion term defined by Equation 2. Edges between nodes can carry a potential score that can be defined by Equation 3 and taken to be the distance between values on either end of the edge (sometimes called arrow).

Messages are defined by equations 4-7 and sent from node to node in the order of the equations listed. The first query node 660 receives a message from the second query node 662 for each query term as defined in Equation 4. This is the uniformly weighted sum-product of cosine distances between one value v in {Q} and all values in {Q}. Each message from the second query node 662 to the first query node 660 represent how well a word (sometimes called a term) in {Q} is clustered to all the other words in {Q}.

The first query node 660 receives a message from the second expansion node 666 for each query term. The message can be the WMA-weighted sum-product of cosine distances between one value in {Q} and all values in {E} and is defined in Equation 5. The message from the second expansion node 666 to the first query node 660 represents how well a word in {Q} is clustered to all the words in {E}.

The first expansion node 664 receives a message from the second expansion node 666 for each expansion term. The message can include the WMA-weighted sum-product of cosine distances between one value in {E} and all values in {E} and is defined in Equation 6. the message from the second expansion node 666 to the first expansion node 664 represents how well an expansion word in {E} is clustered to all the other words in {E}.

The first expansion node 664 receives a message from the first query node 660 for each expansion term. The message can include the uniformly weighted sum-product of cosine distances between an expansion term in {E} and all values in {Q} times the beliefs at the first query node 660 about how well terms in {Q} are clustered to themselves and to terms in {E} and is defined in Equation 7.

Equation 8 shows how the final beliefs about each expansion term in {E} are accumulated at the first expansion node 664. These beliefs represent how well an expansion word in {E} is clustered to all other expansion words in {E} and how well the expansion word is clustered to all query terms in {Q} as a function of how well the query term in {Q} is clustered to all other query terms in {Q} and to all expansion terms in {E}. To help visualize, if an expansion word e in {E} is far from all other expansion words in {E} and its closest neighbor is a query term q in {Q}, but that q is the worst-clustered in {Q}, then the word e likely was a bad expanded term. On the other hand, if e has a closest neighbor e' in {E} and e' is well clustered in {Q, E}, then e is probably also well clustered. The belief determined at the first expansion node 664 and defined in Equation 8 determines values that indicated this clusteredness.

The beliefs collected at the first expansion node 664 can be normalized to sum to a constant, and then sorted. The bottom n % or a specified number can make up a new set {$E_{culled}$}, which is a subset of {E}. Those terms are discarded so that {E}={E}−{$E_{culled}$}. The query can then be submitted to the database as {Q, %}.

The operation 510 can be performed on the result set (corpus) returned from the query. The operation can determine an inflated pseudo-tf-idf of the query terms in {Q} and discounted pseudo-tf-idf of the expansion terms in {E}. The operation 510 can be used to lexically rank the documents in the corpus of returned documents and reduce the corpus size. The operation 510 is discussed in more detail regarding FIG. 7.

Let C be the corpus of results returned from the query at operation 508. The operation 510 can compute the TF-IDF (or pseudo-TF-IDF) of each document in C with respect to all the words in {Q, E} with a discount for the scores for words in {E} since they were not provided by the user. The operation 510 can further provide an inflation for words in {E} into the score for the word in {Q} from which the expansion term was expanded. Thus, the TF-IDF (or pseudo-TF-IDF) for a word q in {Q} is inflated by the TF-IDFs of all the terms extended from q. This inflated IDF represents the information value of q as an entire concept, not just the stand-alone word.

The TF-IDF in Equation 9 is sometimes called the pseudo-TF-IDF as the logarithm that is normally present in a TF-IDF calculation is removed in Equation 9. The removal of the logarithm helps avoid taking logarithm of zero. This modification along with the discounting or inflating of scores leads to the name "pseudo-IDF".

FIG. 7 illustrates, by way of example, a diagram of an embodiment of a belief network 700 for performing the operation 510. The belief network as illustrated includes an expansion node 770 and a query node 772. The following functions can be used in the belief network 700:

Potential Functions $$\text{Node potential} = \sim IDF(x, C) = \begin{cases} \dfrac{N_C}{df(x, C)}, & df(x, C) > 0 \\ 0, & df(x, C) = 0 \end{cases} \quad \text{Equation 9}$$

$$\text{Edge potential} = WMA(q_i, e_j) \quad \text{Equation 10}$$

Messages $$M_{Q \to E}(e_i, C) = 1 + \Sigma_{qj \in Q} \sim IDF(q_j, C) * WMA(q_j, e_i) \quad \text{Equation 11}$$

$$M_{E \to Q}(q_i, C) = 1 + \Sigma_{qj \in E} \sim IDF(e_j, C) * WMA(q_i, e_j) \quad \text{Equation 12}$$

Beliefs $$B_E(e_i, C) = \sim IDF(e_i, C) * M_{Q \to E}(e_i, C) \quad \text{Equation 14}$$

$$N(q_i, C) = \sim IDF(q_i, C) * M_{E \to Q}(q_i, C) \quad \text{Equation 15}$$

Where $N_C$ is number of documents in the corpus C df(x, C) is the number of documents in C where term x (either an expansion term or a query term) was found, q is a value in {Q} and e in {E}.

In the belief network 700, the first query node 772 and the first expansion node 770 represent random variables which can take values in their respective sets {Q} and {E}, respectively.

Each of the query node 772 and the expansion node 770 can carry a potential score as a function of the value the node has taken. Equation 9 shows this is the pseudo-IDF of the value over the corpus.

Each edge (indicated by arrow 774) carries a potential score which can be the WMA between the values taken by the nodes on either end of the edge. This is equation 10. The WMA may be zero if the value in the E node was not extended from the value in the Q node. Messages can be defined by Equations 11 and 12 and sent from node to node in that same order.

The query node 772 can receive a message from the expansion node 770 for each value q in {Q}. The message can include the sum-product of WMA(q,e)*~IDF(e) for all e in {E} as defined in Equation 12. WMA(q, e) is zero for any e which was not extended from q. Thus, the belief about the word q is its own ~IDF(q)*WMA-weighted sum of ~IDF(e) for all the e terms extended from q. The message represents the importance or information value of the word q across the corpus.

The expansion node 770 receives a message from the query node 772 for each value e in {E}. The message can include the sum-product of WMA(q,e)*~IDF(q) for all q in {Q}. WMA(q,e) will be non-zero for only the q from which e was extended. Thus, the belief about the word e is its own ~IDF(e) scaled by the WMA-weighted ~IDF(q). This message represents the discounted importance or information value of the word e across the corpus.

There can be a "+1" constant added to each message so that if ~IDF on the sender side=0 for all values, it will not zero-out the ~IDF on the receive side. That is, the belief generated by the query node 772 or the expansion node 770 about its current value x will always be at least ~IDF(x).

Beliefs collected at the query node 772 and the expansion node 770 can be normalized to sum to one. The normalized beliefs at the query node 772 can form an "importance" distribution $Q_b$ across the original query terms. The normalized beliefs at the expansion node 770 can form a distribution $E_b$ across all terms exteneded from {Q}. For each document in the corpus, the occurrences of terms in {Q, E} can be counted. The corresponding scores from {$Q_b$, $E_b$} can be multipled by the counted number of occurrences. The result can be a cumulative TF-IDF for the document. The documents of the corpus can be sorted by score. The documents with the lowest scores can be discarded. The corpus, C, can thus be reduced to $C_{reduced}$. Using the operation 510, the query terms and expansion terms can be assigned different values. Those different values can be used to determine a better TF-IDF score for a given document in the corpus.

After initial query results are downsized by operation 510, for example, various semantic features can be computed to measure how well documents match the original query. One computation can include a weight matrix determined by a belief network illustrated in FIG. 8. The operation 512 can be performed on the reduced corpus, $C_{reduced}$, from operation 510. The operation 512 can compute a conditional probability (attention) matrix of co-occurrences between each pair of query terms in {Q}. The operation 512 can reuse beliefs from operation 510, but determined on $C_{reduced}$, as the "focus" vector.

Figure 8:
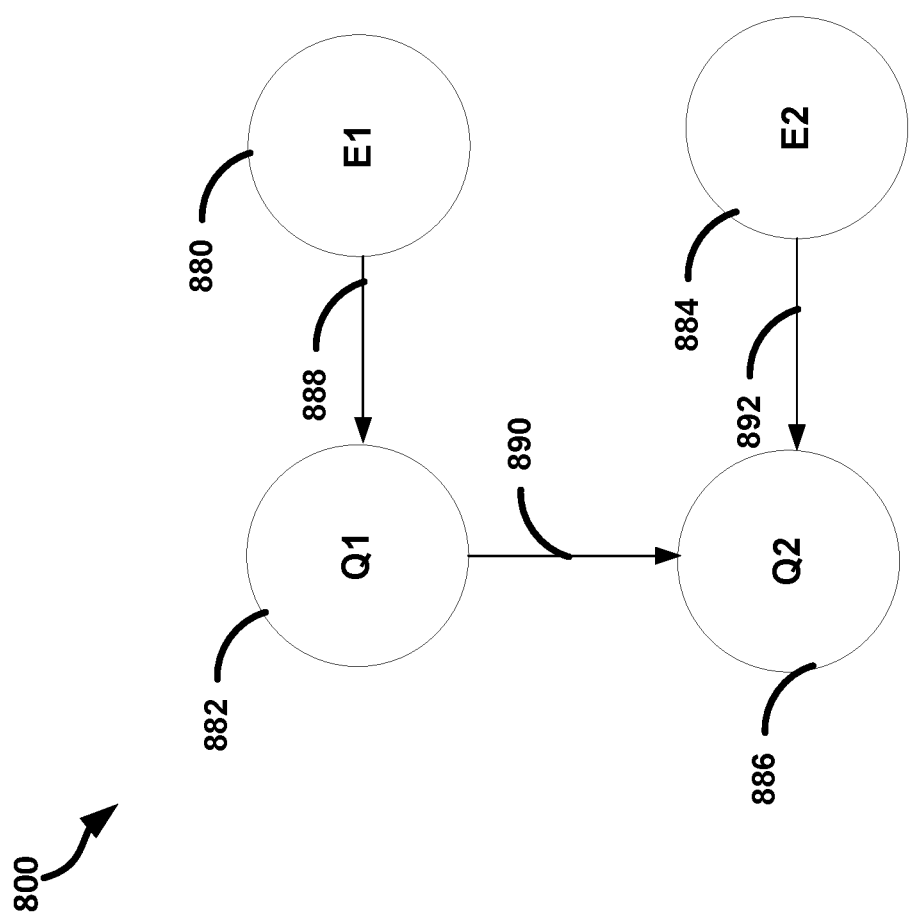
FIG. 8 illustrates, by way of example, a diagram of an embodiment of a belief network for performing the operation.

FIG. 8 illustrates, by way of example, a diagram of an embodiment of a belief network 800 for performing the operation 512. The belief network 800 as illustrated includes a first query node 882, a second query node 886, a first expansion node 880, and a second expansion node 884. The first expansion node 880 issues messages to the first query node 882 (indicated by arrow 888). The first query node 882 issues messages to the second query node 886 (indicated by arrow 890). The second expansion node 884 issues messages to the second query node 886 (indicated by arrow 892). The following functions can be used in the belief network 700:

Potential Functions

Probability Node Potential =
$$P(x, C_{reduced}) = df(x, C_{reduced})/N_c$$
Equation 15

IDF Node Potential = $\sim IDF(x, C_{reduced})$
Equation 16

$E \rightarrow Q$ Edge potential = $WMA(q, e)$
Equation 17

$Q \rightarrow Q$ Edge potential =
$$P(x_i \mid x_j, C_{reduced}) = \frac{df(x_i, x_j, C_{reduced})}{df(x_i, C_{reduced})}$$
Equation 18

Messages $$M_{E1 \rightarrow Q1}(q_i, C_{reduced}) = 1 + \Sigma_{e_j \in E_1} P(e_j, C_{reduced}) * WMA(q_i, e_i)$$
Equation 19

$$M_{E2 \rightarrow Q2}(q_i, C_{reduced}) = 1 + \Sigma_{e_j \in E_2} IDF(e_j, C_{reduced}) * WMA(q_i, e_i)$$
Equation 20

$$M_{Q1 \rightarrow Q2}(q_j \in Q1, q_i \in Q2, C_{reduced}) = P(q_j, C_{reduced}) * P(q_i \mid Q_j, C_{reduced}) * M_{E1 \rightarrow Q1}(q_j, C_{reduced})$$
Equation 21

Beliefs at Q2

$$Z_i(q_i, C_{reduced}) = \sum_{q_j \in Q1} M_{Q1 \rightarrow Q2}(q_j, q_i, C_{reduced})$$
Equation 22

$Attention_{Q2}(q_i, q_j) =$
$$\frac{1}{Z_i(q_i, C_{reduced})} * M_{Q1 \rightarrow Q2}(q_j, q_i, C_{reduced})$$
Equation 23

$Focus_{Q2}(q, C_{reduced}) =$
$$\sim IDF(q, C_{reduced}) * M_{E2 \rightarrow Q2}(q, C_{reduced})$$
Equation 24

Where $N_C$ is number of documents in the corpus $C_{reduced}$, $df(x, C_{reduced})$ is the number of documents in $C_{reduced}$ where term x (either an expansion term or a query term) was found, $q_i$ is a value in {Q} and $e_i$ in {E}.

Each of the first query node 882, the second query node 886, first expansion node 880, and second expansion node 884 carry a potential score as a function of the value the node has taken. The first query node 882 and the first expansion node 880 can have a potential defined by Equation 15. The second query node 886 and the second expansion node 884 can have a potential defined by Equation 16.

Each edge (defined by arrows 888, 890, 892) can carry a potential score which is a function of the values taken by the nodes on either end of the edge. The edge 888 and 892 can carry a potential according to Equation 17. The edge 890 can carry a potential according to Equation 18.

Messages issued by the first expansion node 880, first query node 882, and second expansion node 884 can be defined by Equations 19-21 and sent from node to node in that order. The first query node 882 can receive a message from the first expansion node 880 for each expansion term. The value of the message can be determined by Equation 19. The second query node 886 can receive a message from the second expansion node 884 for each expansion term. The message can indicate a value defined by Equation 20.

The second query node 886 receives a message from the first query node 882 for each query term. The message can indicate a value defined by Equation 21. The belief about each q determined at the first query node 882 is the probability of existence of an entire concept (q and all the e terms extended from it) in $C_{reduced}$. The message from the first query node 882 to the second query node 886 multiplies that belief about q from the first query node 882 by the conditional probability that concept q' occurs in documents containing q.

The attention matrix generated at the second query node 886 is a Q×Q matrix computed by Equation 23. As shown in Table 4, each cell of the attention matrix represents (approximately) the document frequency of one q given the document frequency of another q. Each row of the matrix can be normalized to sum to one as shown in Equation 22. This matrix shows which pairs of concepts are likely to occur together in documents in the corpus, $C_{reduced}$. The attention matrix can be used to help the semantic features of one concept "pay attention" to the semantic features of another concept in a document.

A focus vector can be computed by the second query node 886. The focus vector is defined in Equation 24 and shown in Table 5. The focus vector has a value for each term in {Q}.

After this attention re-weighting of semantic features we use the focus vector to create a weighted sum of the semantic features across all Q concepts. This is done per document in $C_{reduced}$. These attention-focus scores are one set of features which may be used to rank documents in $C_{reduced}$. They may also be combined with other features computed by a larger ensemble system.

Equations 21-23 diverge from standard sum-product belief propagation as they do not propagate sums of products to the second query node 886, but individual products. This is because the conditional probabilities between every combination of values in the first query node 882 and the second query node 886 are provided. This yields values for all cells in Table 4 rather than the margins of a table (which would be the marginal probabilities from standard sum-product propagation).

TABLE 4

Example Attention Matrix

| $i, j \in \{Q\}$ | $j_0$ | $j_1$ | ... | $j_n$ |
|---|---|---|---|---|
| $i_0$ | $P(i_0\|j_0) P(j_0)$ | $P(i_0\|j_1) P(j_1)$ | ... | $P(i_0\|j_n) P(j_n)$ |
| $i_1$ | $P(i_1\|j_0) P(j_0)$ | $P(i_1\|j_1) P(j_1)$ | ... | $P(i_1\|j_n) P(j_n)$ |
| ⋮ | ⋮ | ⋮ | ⋱ | ⋮ |
| $i_n$ | $P(i_n\|j_0) P(j_0)$ | $P(i_n\|j_1) P(j_1)$ | ... | $P(i_n\|j_n) P(j_n)$ |

TABLE 5

Example Focus Matrix

| $i \in \{Q\}$ |
|---|
| ~IDF $(i_0)$ |
| ~IDF $(i_1)$ |
| ⋮ |
| ~IDF $(i_n)$ |

Figure 9:
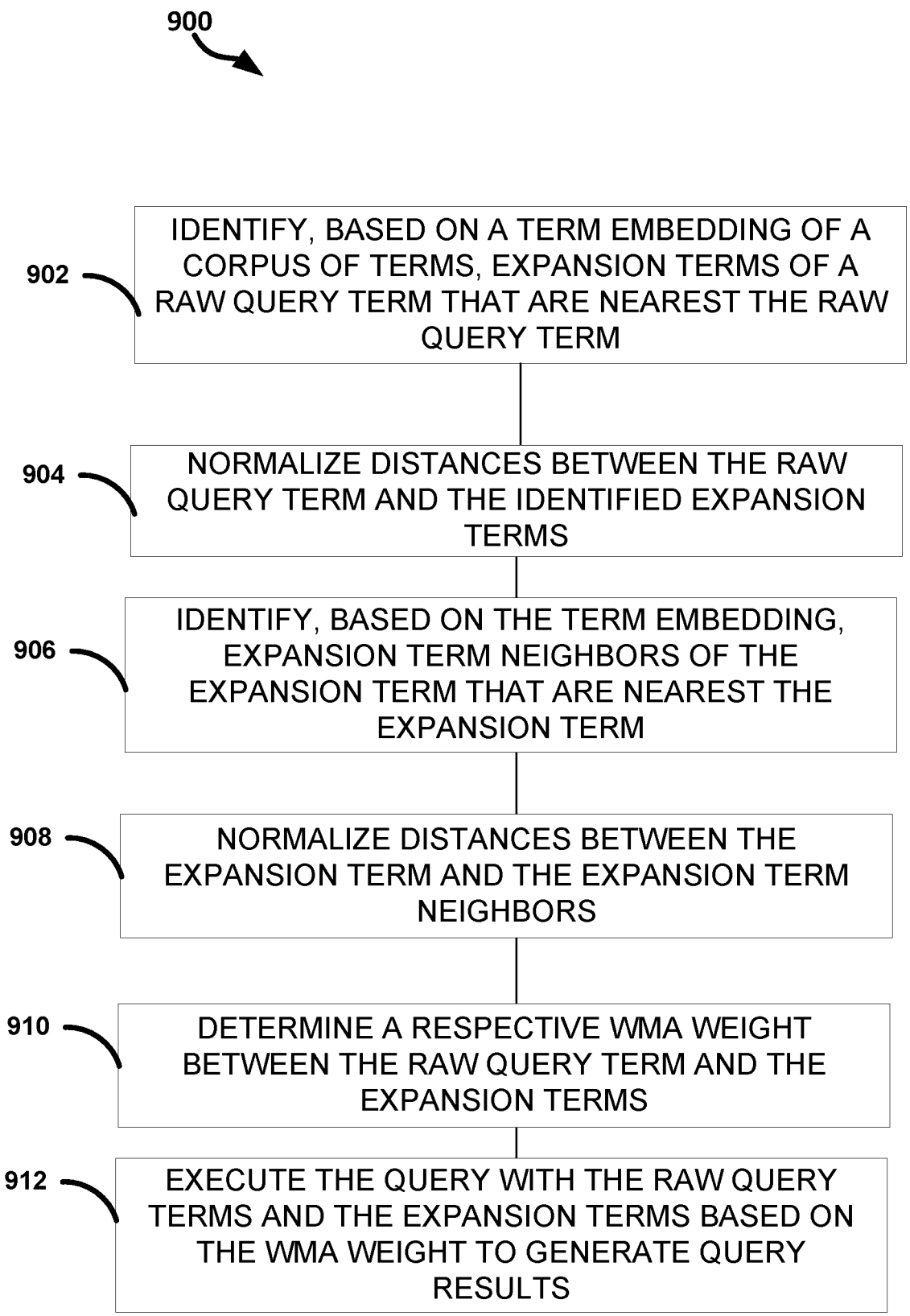
FIG. 9 illustrates, by way of example, a diagram of an embodiment of a method.

FIG. 9 illustrates, by way of example, a diagram of an embodiment of a method 900. The method 900 can be implemented using one or more of the components or operations of FIGS. 1-8. The method 900 as illustrated includes identifying, based on a term embedding of a corpus of terms, expansion terms of a raw query term that are nearest the raw query term, at operation 902; normalizing distances between the raw query term and the identified expansion terms, at operation 904; identifying, based on the term embedding, expansion term neighbors of the expansion term that are nearest the expansion term, at operation 906; normalizing distances between the expansion term and the identified expansion term neighbors, at operation 908; determining a WMA weight between the raw query term and the closest expansion term (based on (1) the raw query term being in the expansion term neighbors, (2) a normalized distance of the normalized distances between the raw query term and the closest expansion term, and (3) a normalized distance of the normalized distances between the closest expansion term and the raw query term), at operation 910; and executing the query with the raw query terms and the expansion terms to generate query results. The operations 906, 908, and 910 can be performed for each identified expansion term from operation 904. Then, all the expansion terms with greater than a specified WMA (e.g., 0, 0.01, 0.05, 0.1, a lesser or greater WMA or some WMA therebetween) can be used along with the raw query terms to query the database.

The method 900 can further include, wherein the WMA weight (raw query term, expansion term) does not equal WMA weight (expansion term, raw query term) for any expansion term of the expansion terms. The method 900 can further include, wherein the WMA weight (raw query term, expansion term) equals the normalized distance between the raw query term and the expansion term scaled by a ratio of the normalized distance between the expansion term and the query term to the normalized distance between the raw query term and the expansion term. The method 900 can further include, wherein the WMA weight (raw query term, expansion term) equals the normalized distance between the raw query term and the closest expansion term scaled by a log of ((the ratio of the normalized distance between the expansion term and the raw query term to the normalized distance between the raw query term and the expansion term) plus one).

The method 900 can further include removing the expansion term from the query before executing the query. Removing the expansion term from the query can be performed in response to determining a belief for the expansion term using a belief network that includes first and second query term nodes and first and second expansion term nodes, the second query node and second expansion node provide messages including respective values indicating how well respective query terms are clustered to all other query terms and expansion terms, respectively, to the first query node, the second expansion node provides messages including respective values indicating how well respective expansion terms are clustered to all other expansion terms to the first expansion node, and the first query node provides messages including respective values indicating how well respective query terms are clustered to all other query terms and expansion terms to the first expansion node. Removing the expansion term from the query can be performed further in response to determining the closest expansion term includes a determined belief less than a threshold value. The method 900 can further include wherein the belief for a given expansion term is provided by the WMA weight for the term, the messages from the second expansion term node to the first expansion term node, and the messages from the first query term node to the first expansion term node.

The method 900 can further include, wherein the messages from the second query node to the first query node indicate a cosine similarity between each query term of the query terms and each other query term of the query terms. The method 900 can further include, wherein the messages from the second query node to the first query node are weighted based on the number of query terms. The method 900 can further include, wherein each message of the messages from the second query node to the first query node indicate a sum of respective cosine similarities between a query term of the query terms and each other query term of the query terms. The method 900 can further include, wherein each message of the messages from the second expansion node to the first query node indicate the WMA weight for an expansion term of the expansion terms weighted by a cosine similarity between the expansion term and a query term of the query terms.

The method 900 can further include, wherein each message of the messages from the second expansion node to the first query node indicate, for a respective query term, a sum, over all expansion terms, of the WMA weight of the respective expansion term times the cosine similarity between the respective expansion term and the query term. The method 900 can further include, wherein each message of the messages from the second expansion node to the first expansion node indicate the WMA weight for an expansion term of the expansion terms weighted by a cosine similarity between the expansion term and each other expansion term of the expansion terms. The method 900 can further include, wherein each message of the messages from the second expansion node to the first expansion node indicate, for a respective expansion term, a sum, over all other expansion terms, of the WMA weight of the respective expansion term times the cosine similarity between the respective expansion term and all other expansion terms.

The method 900 can further include, wherein each message of the messages from the first query node to the first expansion node indicate weighted values of a combination of messages from the second expansion node to the first query node and the messages from the second query node to the first query node. The method 900 can further include, wherein the belief, for each expansion term, is determined based on a multiplication of a message regarding the expansion term from the second expansion node to the first expansion node, a message regarding the expansion term from the first query node to the first expansion node, and the WMA weight for the expansion term.

The method 900 can further include removing results of the generated query results in response to determining respective belief values for each query term and expansion term using a belief network, the belief network including a query node and an expansion node that exchange messages including values indicating (i) an importance of the query term across the results and (ii) an importance of the expansion term across the results. The method 900 can further include scoring respective results based on the beliefs and whether {one or more of the expansion terms, one or more of the query terms} appears in the result. The method 900 can further include removing results with lowest determined scores to generate a set of culled results. The method 900 can further include returning the culled results.

The method 900 can further include, wherein the messages from the query node to the expansion node include a pseudo-term frequency-inverse document frequency (tf-idf) value of the expansion term discounted by a WMA weighted pseudo-tf-idf value. The method 900 can further include, wherein the value indicated by a message of the messages from the query node to the expansion node is, for each expansion term of the expansion terms, the sum, over all query terms, of the pseudo-tf-idf of the query term times the WMA weight of the expansion term and query term. The method 900 can further include, wherein the messages from the expansion node to the query node include a pseudo-term frequency-inverse document frequency (tf-idf) value of the query term inflated by a WMA weighted pseudo-tf-idf value of the expansion terms extended from the query term by the WMA of the query terms. The method 900 can further include, wherein the value indicated by a message of the messages from the expansion node to the query node is, for each query term of the query terms, the sum, over all expansion terms, of the pseudo-tf-idf of the expansion term times the WMA weight of the query term and expansion term.

The method 900 can further include normalizing the query beliefs (beliefs generated by a query node) and the expansion beliefs (beliefs generated by an expansion node). The method 900 can further include, wherein scoring respective results based on the beliefs and whether {one or more of the expansion terms, one or more of the query terms} appears in the result includes counting the occurrences of each of the expansion terms and the query terms in each result, multiplying the normalized query beliefs and the expansion beliefs by the respective number of occurrences to generate total scores for each of the query terms and the expansion terms, and summing the total scores.

The method 900 can further include ranking the culled results by determining respective belief values for each query term and expansion term using a belief network, the belief network including first and second query nodes and first and second expansion nodes, the messages between first expansion node and the first query node including values indicating an importance of the query term across the culled result set, the messages between the second expansion node and the second query node indicating an importance of the expansion term across the culled result set, and the messages between the first query node and the second query node indicating, for a given query term, a likelihood that another query term of the query terms occurs in a same result as the query term. The method 900 can further include scoring respective results based on the determined beliefs to generate respective scores for the results. The method 900 can further include returning the results with the highest scores. The method 900 can further include, wherein scoring respective results based on the determined beliefs includes computing an attention matrix of normalized values of the messages from the first query node to the second query node to generate a score matrix, computing a focus vector of values of the messages from the second expansion node to the second query node, and applying the focus vector to the attention matrix to generate a score vector, and applying a semantic vector representing semantic similarity between query words and words in the document that were considered lexical matches to the score vector to generate a scalar score per result.

The method 900 can further include, wherein the messages from the first expansion node to the first query node include a probability the expansion term appears in the culled result set weighted by a WMA weight. The method 900 can further include, wherein the value indicated by a message of the messages from the first expansion node to the first query node is, for each query term of the query terms, the sum, over all expansion terms, of the probability the expansion term appears in the culled result times the WMA weight of the expansion term and query term.

The method 900 can further include, wherein the messages from the second expansion node to the second query node include a term frequency-inverse document frequency (tf-idf) value weighted by a WMA weight. The method 900 can further include, wherein the value indicated by a message of the messages from the second expansion node to the second query node is, for each query term of the query terms, the sum, over all expansion terms, of the tf-idf of the query term times the WMA weight of the expansion term and query term. The method 900 can further include, wherein the value indicated by messages from the first query node to the second query node include a probability the query term appears in a result of the culled result set times the value indicated by a message of the messages from the first expansion node to the first query node regarding the query term times a conditional probability another query term appears in the result given the query term appears in the culled result. The method 900 can further include, wherein scoring respective results based on the determined beliefs includes computing the attention matrix from normalized values of the messages from the first query node to the second query. The method 900 can further include, wherein scoring respective results based on the determined beliefs includes applying the focus vector to the attention matrix to generate a score vector. The method 900 can further include, wherein scoring respective results based on the determined beliefs includes applying a semantic vector representing semantic similarity between query words and words in the document that were considered lexical matches to the score vector to generate a scalar.

Figure 10:
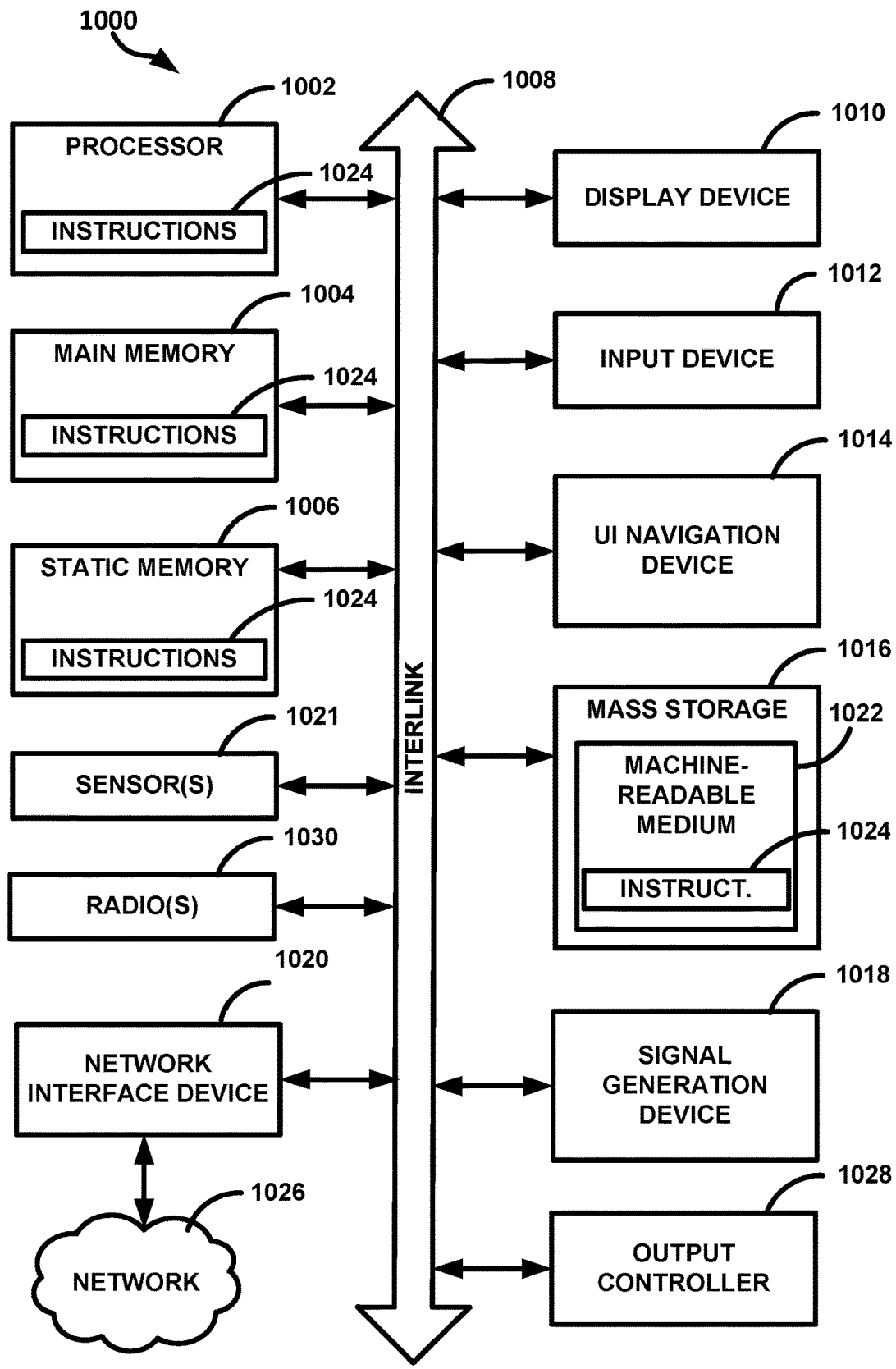
FIG. 10 illustrates, by way of example, a block diagram of an embodiment of a machine in the example form of a computer system within which instructions, for causing the machine to perform any one or more of the methodologies discussed herein, may be executed.

FIG. 10 illustrates, by way of example, a block diagram of an embodiment of a machine in the example form of a computer system 1000 within which instructions, for causing the machine to perform any one or more of the methodologies discussed herein, may be executed. One or more of the operations of FIGS. 1-9, can be implemented using, or can include, one or more components of the system 1000. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, an embedded system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation device 1014 (e.g., a mouse), a mass storage unit 1016, a signal generation device 1018 (e.g., a speaker), a network interface device 1020, and a radio 1030 such as Bluetooth, WWAN, WLAN, and NFC, permitting the application of security controls on such protocols.

The mass storage unit 1016 includes a machine-readable medium 1022 on which is stored one or more sets of instructions and data structures (e.g., software) 1024 embodying or utilized by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media.

While the machine-readable medium 1022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any tangible or intangible medium that is capable of storing, encoding or carrying instructions for execution by the machine, and includes digital or analog communications signals or other intangible media to facilitate communication of such software.

ADDITIONAL NOTES AND EXAMPLES

Example 1 can include a method of retrieving results based on a query including raw query terms and expansion terms using Weighted Mutual Affinity (WMA), the method comprising identifying, based on a term embedding of a corpus of terms, expansion terms of a raw query term from among other embedded terms that are nearest the raw query term, normalizing distances between the raw query term and the expansion terms, for each identified expansion term: identifying, based on the term embedding, expansion term neighbors of the closest expansion term that are nearest the expansion term, normalizing distances between the expansion term and the expansion term neighbors, determining a WMA weight between the raw query term and the closest expansion term based on (1) the raw query term being in the expansion term neighbors, (2) a normalized distance of the normalized distances between the raw query term and the closest expansion term, and (3) a normalized distance of the normalized distances between the closest expansion term and the raw query term, and executing the query with the raw query terms and the expansion terms to generate query results.

In Example 2, Example 1 can further include, wherein the WMA weight (raw query term, expansion term) does not equal WMA weight (expansion term, raw query term) for any expansion term of the expansion terms.

In Example 3, Example 2 can further include, wherein the WMA weight (raw query term, expansion term) equals the normalized distance between the raw query term and the expansion term scaled by a ratio of the normalized distance between the expansion term and the query term to the normalized distance between the raw query term and the expansion term.

In Example 4, Example 3 can further include, wherein the WMA weight (raw query term, expansion term) equals the normalized distance between the raw query term and the closest expansion term scaled by a log of ((the ratio of the normalized distance between the expansion term and the raw query term to the normalized distance between the raw query term and the expansion term) plus one).

In Example 5, at least one of Examples 1-4 can further include removing the expansion term from the query before executing the query in response to determining a belief for the expansion term using a belief network that includes first and second query term nodes and first and second expansion term nodes, the second query node and second expansion node provide messages including respective values indicating how well respective query terms are clustered to all other query terms and expansion terms, respectively, to the first query node, the second expansion node provides messages including respective values indicating how well respective expansion terms are clustered to all other expansion terms to the first expansion node, and the first query node provides messages including respective values indicating how well respective query terms are clustered to all other query terms and expansion terms to the first expansion node, and determining the closest expansion term includes a determined belief less than a threshold value.

In Example 6, at least one of Examples 1-5 can further include removing results of the generated query results in response to determine respective belief values for each query term and expansion term using a belief network, the belief network including a query node and an expansion node that exchange messages including values indicating (i) an importance of the query term across the results and (ii) an importance of the expansion term across the results, scoring respective results based on the beliefs and whether {one or more of the expansion terms, one or more of the query terms} appears in the result, removing results with lowest determined scores to generate a set of culled results, and returning the culled results.

In Example 7, Example 6 can further include ranking the culled results by determining respective belief values for each query term and expansion term using a belief network, the belief network including first and second query nodes and first and second expansion nodes, the messages between first expansion node and the first query node including values indicating an importance of the query term across the culled result set, the messages between the second expansion node and the second query node indicating an importance of the expansion term across the culled result set, and the messages between the first query node and the second query node indicating, for a given query term, a likelihood that another query term of the query terms occurs in a same result as the query term, scoring respective results based on the determined beliefs to generate respective scores for the results, and returning the results with the highest scores.

In Example 8, Example 7 can further include, wherein scoring respective results based on the determined beliefs includes computing an attention matrix of normalized values of the messages from the first query node to the second query node to generate a score matrix, computing a focus vector of values of the messages from the second expansion node to the second query node, and applying the focus vector to the attention matrix to generate a score vector, and applying a semantic vector representing semantic similarity between query words and words in the document that were considered lexical matches to the score vector to generate a scalar score per result.

Example 9 can include a non-transitory machine-readable medium including instructions that, when executed by a machine, cause the machine to perform operations for retrieving results based on a query including raw query terms and expansion terms using Weighted Mutual Affinity (WMA), the operations comprising the method of one of Examples 1-8.

Example 10 includes a system comprising a memory including instructions, and processing circuitry coupled to the memory, the processing circuitry to execute the instructions of the memory to implement a program for retrieving results based on a query including raw query terms and expansion terms using Weighted Mutual Affinity (WMA), the program comprising the method of one of Examples 1-8.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method of retrieving results based on a query including raw query terms and expansion terms using Weighted Mutual Affinity (WMA), the method comprising:
   identify, based on respective term embedding vectors of a corpus of terms, a first number of first expansion terms of a raw query term that are nearest to the raw query term in an embedding space;
   normalize distances between the raw query term and the identified first expansion terms in the embedding space resulting in normalized raw-expansion distances that sum to a constant number;
   for each identified first expansion term of the first expansion terms:
   identify, based on the respective term embedding vectors, the first number of expansion term neighbors of the first expansion term that are nearest to the first expansion term in the embedding space;
   normalize distances between the first expansion term and the identified expansion term neighbors in the embedding space resulting in expansion-expansion distances that sum to the constant number;
   determine, for each first expansion term for which the raw query term is in the expansion term neighbors, a WMA weight between the raw query term and the first expansion term based on (1) 4 normalized raw-expansion distance of the normalized raw-expansion distances between the raw query term and the first expansion term, and (2) a normalized expansion-expansion distance of the normalized expansion-expansion distances between the first expansion term and the raw query term; and
   execute the query with the raw query term and a second number of the first expansion terms with a corresponding WMA weight higher than a specified threshold, to generate query results; wherein the WMA weight is asymmetric such, that the WMA weight between (i) the raw query term and (ii) the first expansion term does not equal the WMA weight between (i) the first expansion term, and (ii) the raw query term for any first expansion term of the first expansion terms.

2. The method of claim 1, wherein the WMA weight between (i) the raw query term and (ii) the first expansion term equals the normalized raw-expansion distance between the raw query term and the expansion term scaled by a ratio of (i) the normalized expansion-expansion distance between the expansion term and the raw query term to (ii) the normalized raw-expansion distance between the raw query term and the expansion term.

3. The method of claim 2, wherein the WMA weight between (i) the raw query term and the expansion term equals the normalized raw-expansion distance between the raw query term and the closest expansion term scaled by a log of (i) the ratio of (i) the normalized expansion-expansion distance between the expansion term and the raw query term to (ii) the normalized raw-expansion distance between the raw query term and the expansion term plus one.

4. The method of claim 1, further comprising removing the first expansion term from the query before executing the query in response to:
   determining a belief for the first expansion term using a belief network that includes first and second query term nodes and first and second expansion term nodes, the second query node and second expansion node provide messages including respective values indicating how well respective query terms are clustered to all other query terms and expansion terms, respectively, to the first query node, the second expansion node provides messages including respective values indicating how well respective expansion terms are clustered to all other expansion terms to the first expansion node, and the first query node provides messages including respective values indicating how well respective query terms are clustered to all other query terms and expansion terms to the first expansion node; and determining the closest expansion term includes a determined belief less than a threshold value.

5. The method of claim 1 further comprising removing results of the generated query results in response to:

determining respective belief values for each query term and first expansion term using a belief network, the belief network including a query node and an expansion node that exchange messages including values indicating (i) an importance of the query term across the results and (ii) an importance of the first expansion term across the results;

scoring respective results based on the beliefs and whether one or more of the first expansion terms and one or more of the query terms appears in the result;

removing results with lowest determined scores to generate a set of culled results; and returning the culled results.

6. The method of claim 5 further comprising, ranking the culled results by determining respective belief values for each query term and first expansion term using a belief network, the belief network including first and second query nodes and first and second expansion nodes, the messages between first expansion node and the first query node including values indicating an importance of the query term across the culled result set, the messages between the second expansion node and the second query node indicating an importance of the expansion term across the culled result set, and the messages between the first query node and the second query node indicating, for a given query term, a likelihood that another query term of the query terms occurs in a same result as the query term;

scoring respective results based on the determined beliefs to generate respective scores for the results; and returning the results with the highest scores.

7. The method of claim 6, wherein scoring respective results based on the determined beliefs includes computing an attention matrix of normalized values of the messages from the first query node to the second query node to generate a score matrix, computing a focus vector of values of the messages from the second expansion node to the second query node, and applying the focus vector to the attention matrix to generate a score vector, and applying a semantic vector representing semantic similarity between query words and words in the document that were considered lexical matches to the score vector to generate a scalar score per result.

8. A non-transitory machine-readable medium including instructions that, when executed by a machine, cause the machine to perform operations for retrieving results based on a query including raw query terms and expansion terms using Weighted Mutual Affinity (WMA), the operations comprising:

identifying, based on respective term embedding vectors of a corpus of terms, expansion terms of a raw query term that are nearest to the raw query term in an embedding space;

normalizing distances between the raw query term and the identified expansion terms resulting in normalized raw-expansion distances that sum to a constant number;

for each identified expansion term;

identifying, based on the respective term embedding vectors, a first number of expansion term neighbors of the expansion term that are nearest to the expansion term in the embedding space;

normalizing distances between the expansion term and the identified expansion term neighbors resulting in expansion-expansion distances that sum to the constant number;

determining, for each expansion term for which the raw query term is in the expansion term neighbors, a WMA weight between the raw query term and the expansion term based on (1) a normalized raw-expansion distance of the raw-expansion normalized distances between the raw query term and the expansion term, and (2) a normalized expansion-expansion distance of the expansion-expansion normalized distances between the expansion term and the raw query term; and executing the query with the raw query term and a second number of the expansion terms with a corresponding WMA weight higher than a user-specified threshold, determined based on the constant, to generate query results; wherein the WMA weight is asymmetric such, that the WMA weight between (i) the raw query term and (ii) the first expansion term does not equal the WMA weight between (i) the first expansion term, and (ii) the raw query term for any first expansion term of the first expansion terms.

9. The non-transitory machine-readable medium of claim 8, wherein the WMA weight between (i) the raw query term and (ii) the first expansion term equals the normalized raw-expansion distance between the raw query term and the expansion term scaled by a ratio of (i) the normalized expansion-expansion distance between the expansion term and (ii) raw query term to the normalized raw-expansion distance between the raw query term and the expansion term.

10. The non-transitory machine-readable medium of claim 9, wherein the WMA weight between (i) the raw query term and (ii) the expansion term equals the normalized raw-expansion distance between the raw query term and the closest expansion term scaled by a log of the ratio of (i) the normalized expansion-expansion distance between the expansion term and the raw query term to (ii) the normalized raw-expansion distance between the raw query term and the expansion term plus one.

11. The non-transitory machine-readable medium of claim 8, wherein the operations further comprise removing the expansion term from the query before executing the query in response to:

determining a belief for the expansion term using a belief network that includes first and second query term nodes and first and second expansion term nodes, the second query node and second expansion node provide messages including respective values indicating how well respective query terms are clustered to all other query terms and expansion terms, respectively, to the first query node, the second expansion node provides messages including respective values indicating how well respective expansion terms are clustered to all other expansion terms to the first expansion node, and the first query node provides messages including respective values indicating how well respective query terms are clustered to all other query terms and expansion terms to the first expansion node; and determining the expansion term includes a determined belief less than a threshold value.

12. The non-transitory machine-readable medium of claim 8, wherein the operations further comprise removing results of the generated query results in response to:

determining respective belief values for each query term and expansion term using a belief network, the belief network including a query node and an expansion node that exchange messages including values indicating (i) an importance of the query term across the results and (ii) an importance of the expansion term across the results;

scoring respective results based on the beliefs and whether one or more of the expansion terms and one or more of the query terms appears in the result;

removing results with lowest determined scores to generate a set of culled results; and returning the culled results.

13. A system comprising:

a memory including instructions;

processing circuitry coupled to the memory, the processing circuitry to execute the instructions of the memory to implement a program for retrieving results based on a query including raw query terms and expansion terms using Weighted Mutual Affinity (VMA) the program comprising;

identifying, based on respective term embedding vectors of a corpus of terms, a first number of expansion terms of a raw query term that are nearest to the raw query term in an embedding space, normalizing distances between the raw query term and the identified expansion terms resulting in normalized raw-expansion distances that sum to 4 constant number;

for each identified expansion term:

identifying, based on the respective term embedding vectors, the first number of expansion term neighbors of the expansion term that are nearest to the expansion term;

normalizing distances between the expansion term and the identified expansion term neighbors in the embedding space resulting in expansion-expansion distances that sum to the constant number;

determining, for each expansion term for which the raw query term is in the expansion term neighbors, a WMA weight between the raw query term and the expansion term based on (1) a normalized raw-expansion distance of the normalized raw-expansion distances between the raw query term and the expansion term, and (2) a normalized expansion-expansion distance of the normalized expansion-expansion distances between the expansion term and the raw query term; and executing the query with the raw query term and a second number of the expansion terms with a corresponding WMA weight higher than a user-specified threshold, determined based on the constant, to generate query results; wherein the WMA weight is asymmetric such that the WMA weight between (i) the raw query term and (ii) the first expansion term does not equal the WMA weight between (i) the first expansion term, and (ii) the raw query term for any first expansion term of the first expansion terms.

14. The system of claim 13, wherein the program further comprises removing the expansion term from the query before executing the query in response to:

determining a belief for the expansion term using a belief network that includes first and second query term nodes and first and second expansion term nodes, the second query node and second expansion node provide messages including respective values indicating how well respective query terms are clustered to all other query terms and expansion terms, respectively, to the first query node, the second expansion node provides messages including respective values indicating how well respective expansion terms are clustered to all other expansion terms to the first expansion node, and the first query node provides messages including respective values indicating how well respective query terms are clustered to all other query terms and expansion terms to the first expansion node; and determining the expansion term includes a determined belief less than a threshold value.

15. The system of claim 13, wherein the program further comprises removing results of the generated query results in response to:

determining respective belief values for each query term and expansion term using a belief network, the belief network including a query node and an expansion node that exchange messages including values indicating (i) an importance of the query term across the results and (ii) an importance of the expansion term across the results;

scoring respective results based on the beliefs and whether one or more of the expansion terms, one or more of the query terms) appears in the result;

removing results with lowest determined scores to generate a set of culled results; and returning the culled results.

16. The system of claim 15, wherein the program further comprises, ranking the culled results by:

determining respective belief values for each query term and expansion term using a belief network, the belief network including first and second query nodes and first and second expansion nodes, the messages between first expansion node and the first query node including values indicating an importance of the query terms across the culled result set, the messages between the second expansion node and the second query node indicating an importance of the expansion term across the culled result set, and the messages between the first query node and the second query node indicating, for a given query term, a likelihood that another query term of the query terms occurs in a same result as the query term;

scoring respective results based on the determined beliefs to generate respective scores for the results; and returning the results with the highest scores.

17. The method of claim 16, wherein scoring respective results based on the determined beliefs includes computing an attention matrix of normalized values of the messages from the first query node to the second query node to generate a score matrix, computing a focus vector of values of the messages from the second expansion node to the second query node, and applying the focus vector to the attention matrix to generate a score vector, and applying a semantic vector representing semantic similarity between query words and words in the document that were considered lexical matches to the score vector to generate a scalar score per result.

18. The system of claim 13, wherein the WMA weight between (i) the raw query term and (ii) the expansion term does not equal a WMA weight between (i) the expansion term and (ii) the raw query term, and the WMA weight between (i) the raw query term and (ii) the expansion term equals the normalized raw-expansion distance between the raw query term and the expansion term scaled by a ratio of (i) the normalized expansion-expansion distance between the expansion term and the raw query term to (ii) the normalized raw-expansion distance between the raw query term and the expansion term.

* * * * *